US012693729B2

(12) United States Patent (10) Patent No.: US 12,693,729 B2
Wei et al. (45) Date of Patent: Jul. 28, 2026

(54) METHOD FOR CONFIGURING VIRTUAL INPUT INTERFACE, HOST, AND COMPUTER READABLE STORAGE MEDIUM

(71) Applicant: HTC Corporation, Taoyuan City (TW)

(72) Inventors: Chang-Hua Wei, Taoyuan City (TW); Yu-Ling Huang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 18/666,768

(22) Filed: May 16, 2024

(65) Prior Publication Data

US 2025/0355484 A1 Nov. 20, 2025

(51) Int. Cl.
*G06F 3/01* (2006.01)
*G06F 3/0481* (2022.01)
*G06V 40/10* (2022.01)

(52) U.S. Cl.
CPC .............. *G06F 3/011* (2013.01); *G06F 3/017* (2013.01); *G06F 3/0481* (2013.01); *G06V 40/11* (2022.01)

(58) Field of Classification Search
CPC ........ G06F 3/011; G06F 3/017; G06F 3/0481; G06F 3/014; G06F 3/048–04897; G06V 40/11
See application file for complete search history.

(56) References Cited

U.S. PATENT DOCUMENTS

| | | | | |
|---|---|---|---|---|
| 12,158,992 B1 * | 12/2024 | Yan | .......................... | G06V 40/11 |
| 2010/0302155 A1 * | 12/2010 | Sands | .................. | G06F 3/04886 |
| | | | | 345/173 |
| 2010/0302165 A1 | 12/2010 | Li | | |
| 2014/0115520 A1 | 4/2014 | Itani | | |
| 2015/0087275 A1 * | 3/2015 | Brisebois | .................. | G06T 3/20 |
| | | | | 455/414.1 |
| 2017/0090747 A1 * | 3/2017 | Dash | ......................... | G06F 1/163 |
| 2018/0329209 A1 * | 11/2018 | Nattukallingal | ....... | G02B 27/01 |
| 2020/0225758 A1 * | 7/2020 | Tang | ....................... | G06F 3/012 |
| 2023/0393649 A1 | 12/2023 | Zeng | | |
| 2024/0061514 A1 | 2/2024 | Reisman et al. | | |
| 2024/0134460 A1 | 4/2024 | Millar et al. | | |
| 2024/0168542 A1 | 5/2024 | Klein et al. | | |

FOREIGN PATENT DOCUMENTS

| | | |
|---|---|---|
| CN | 104951073 | 9/2015 |
| CN | 106896915 | 6/2017 |
| CN | 114690900 | 7/2022 |
| TW | 201246005 | 11/2012 |

(Continued)

OTHER PUBLICATIONS

"Office Action of U.S. Related Application, U.S. Appl. No. 18/666,757", issued on Mar. 24, 2025, p. 1-p. 12.

(Continued)

*Primary Examiner* — Roberto W Flores
(74) *Attorney, Agent, or Firm* — JCIPRNET

(57) ABSTRACT

The embodiments of the disclosure provide a method for providing an input interface, a host, and a computer readable storage medium. The method includes: tracking at least one feature point on a hand; and configuring a layout of at least one virtual input element on the virtual input interface based on the at least one feature point.

17 Claims, 8 Drawing Sheets

(56)          References Cited

FOREIGN PATENT DOCUMENTS

| TW | 202217541 | 5/2022 |
| TW | 202319887 | 5/2023 |

OTHER PUBLICATIONS

"Office Action of Taiwan Counterpart Application", issued on Jun. 27, 2025, p. 1-p. 9.
"Office Action of Taiwan Related Application, Application No. 113133327", issued on Apr. 28, 2025, p. 1-p. 8.
"Office Action of U.S. related Application, U.S. Appl. No. 18/666,757", issued on Oct. 1, 2025, p. 1-p. 12.

* cited by examiner tracking a hand gesture of a hand ⟋ S210 in response to determining that the hand gesture of the hand indicates that the hand has performed a target gesture, displaying a virtual input interface in a visual content associated with a reality service ⟋ S220

S610 tracking at least one feature point on the hand

S620 configuring a layout of at least one virtual input element on the virtual input interface based on the at least one feature point

METHOD FOR CONFIGURING VIRTUAL INPUT INTERFACE, HOST, AND COMPUTER READABLE STORAGE MEDIUM

BACKGROUND

1. Field of the Invention

The present disclosure generally relates to a mechanism for providing a reality service, in particular, to a method for configuring a virtual input interface, a host, and a computer readable storage medium.

2. Description of Related Art

Most virtual reality (VR) software still relies on the user to operate the hardware/physical input elements on the traditional physical handheld controller interfaces for inputting commands. However, the emergence of gesture tracking technology is gradually changing this landscape. Such a shift necessitates software developers to rethink and adjust their designs to fully leverage the potential of gesture tracking technology. Simultaneously, users also need some time to familiarize themselves with and master the new ways of gesture-based interactions, which may require some education and guidance.

SUMMARY OF THE INVENTION

Accordingly, the disclosure is directed to a method for configuring a virtual input interface, a host, and a computer readable storage medium, which may be used to solve the above technical problems.

The embodiments of the disclosure provide a method for configuring an input interface, applied to a host. The method includes: tracking, by the host, at least one feature point on a hand; and configuring, by the host, a layout of at least one virtual input element on the virtual input interface based on the at least one feature point.

The embodiments of the disclosure provide a host, including a storage circuit and a processor. The storage circuit stores a program code. The processor is coupled to the non-transitory storage circuit and accessing the program code to perform: tracking at least one feature point on a hand; and configuring a layout of at least one virtual input element on the virtual input interface based on the at least one feature point.

The embodiments of the disclosure provide a computer readable storage medium, the computer readable storage medium recording an executable computer program, the executable computer program being loaded by a host to perform steps of: tracking at least one feature point on a hand; and configuring a layout of at least one virtual input element on the virtual input interface based on the at least one feature point.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
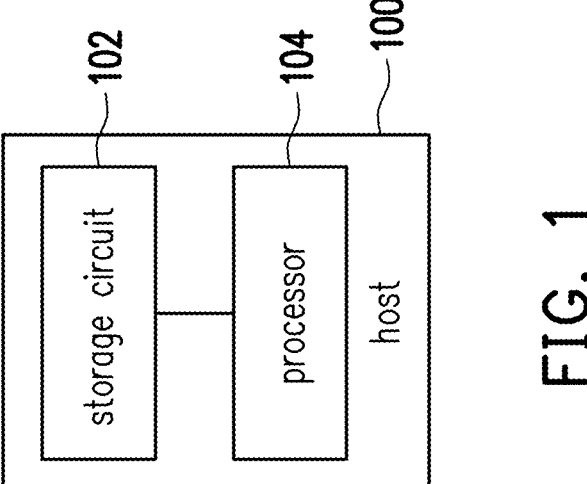
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any device capable of performing tracking functions (e.g., inside-out tracking and/or outside-in tracking) on one or more to-be-tracked objects (e.g., the hands of the user of the host 100) within a tracking range of the host 100.

In the embodiments of the disclosure, the host 100 may be configured with a tracking camera having an image-capturing range corresponding to the tracking range. When the to-be-tracked objects (e.g., the hands) is within the tracking range, the cameras on the host 100 may capture images of the to-be-tracked objects, and the host 100 may track the pose of each to-be-tracked object based on the captured images. For better understanding, this tracking mechanism may be referred to as the computer vision (CV) approach, but the disclosure is not limited thereto.

In some embodiments, the host 100 can track the hand gesture(s) of the hand(s) in the tracking range and accordingly render the corresponding hand object(s) in the provided visual content.

In some embodiments, one or more wearable devices can be worn on the to-be-tracked object (e.g., the user's hand) for facilitating the host 100 to track the to-be-tracked object. For example, two wearable devices (e.g., smart rings or gloves) may be respectively worn on the thumb and index finger of the user's hand for tracking the hand gesture of the user's hand.

In one embodiment, the wearable devices may be disposed with motion detection circuits (e.g., inertia measurement unit (IMU)) for providing the motion data (e.g., IMU data) characterizing the movement/gesture/pose of the user's hand/fingers. For better understanding, this tracking mechanism may be referred to as the motion detection approach, but the disclosure is not limited thereto.

Additionally or alternatively, the wearable devices may be disposed with Electromyography (EMG) detection circuits for providing the EMG data characterizing the movement/gesture/pose of the user's hand/fingers, but the disclosure is not limited thereto. For better understanding, this tracking mechanism may be referred to as the EMG detection approach, but the disclosure is not limited thereto.

In various embodiments, the host 100 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 100 can be a head-mounted display (HMD) capable of showing/providing visual contents (e.g., AR/VR/MR contents) for the wearer/user to see. For better understanding the concept of the disclosure, the host 100 would be assumed to be the HMD for providing VR contents (e.g., the VR world) to the user, but the disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules stored in the storage circuit 102 to implement the method for providing an input interface provided in the disclosure, which would be further discussed in the following.

Figure 2:
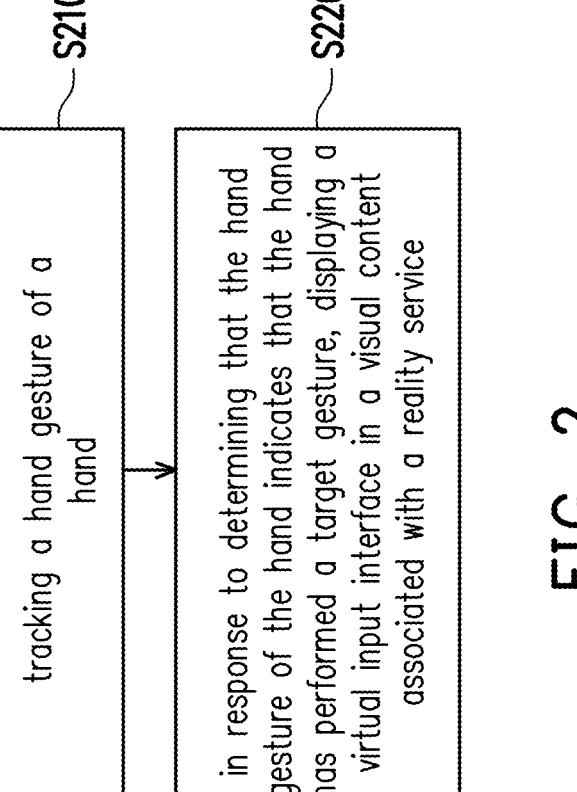
FIG. 2 shows a flow chart of the method for providing an input interface according to an embodiment of the disclosure.

See FIG. 2, which shows a flow chart of the method for providing an input interface according to an embodiment of the disclosure. The method of this embodiment may be executed by the host 100 in FIG. 1, and the details of each step in FIG. 2 will be described below with the components shown in FIG. 1.

In step S210, the processor 104 tracks a hand gesture of a hand. In the embodiments of the disclosure, the hand may be the hand of the user of the HMD, but the disclosure is not limited thereto.

In various embodiments, the processor 104 may track the hand gesture by using one or a combination of the above-mentioned tracking mechanisms, such as the CV approach, the motion detection approach, and/or the EMG approach.

For example, the processor 104 may receive a first motion data (e.g., IMU data) from a first wearable device (e.g., a first smart ring) worn on a first finger (e.g., the thumb) of the hand, receive a second motion data from a second wearable device (e.g., a second smart ring) worn on a second finger (e.g., the index finger) of the hand, and determine the hand gesture of the hand based on the first motion data and the second motion data.

For another example, the processor 104 may receive a first EMG data from the first wearable device worn on the first finger of the hand, receive a second EMG data from the second wearable device worn on the second finger of the hand, and determine the hand gesture of the hand based on the first EMG data and the second EMG data.

For yet another example, the processor 104 may control the tracking camera to capture an image of the hand and accordingly determine the hand gesture of the hand.

In the embodiments of the disclosure, the processor 104 may determine whether the hand gesture of the hand indicates that the hand has performed a target gesture.

Figure 3B:
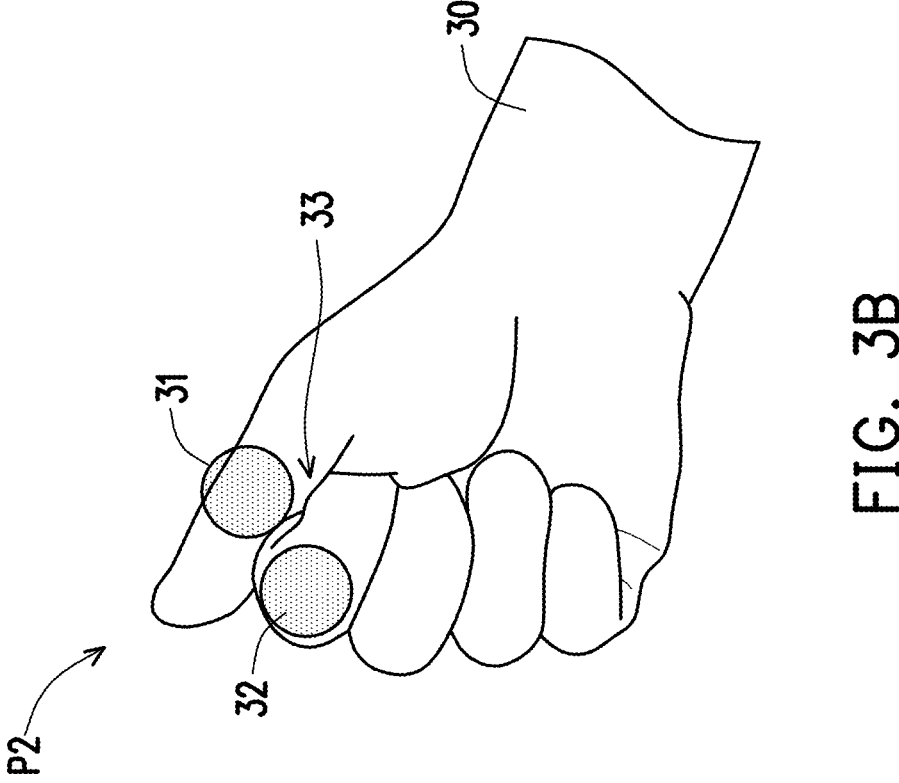
FIG. 3A and FIG. 3B show different variations of possible target gestures according to embodiments of the disclosure.
Figure 3A:
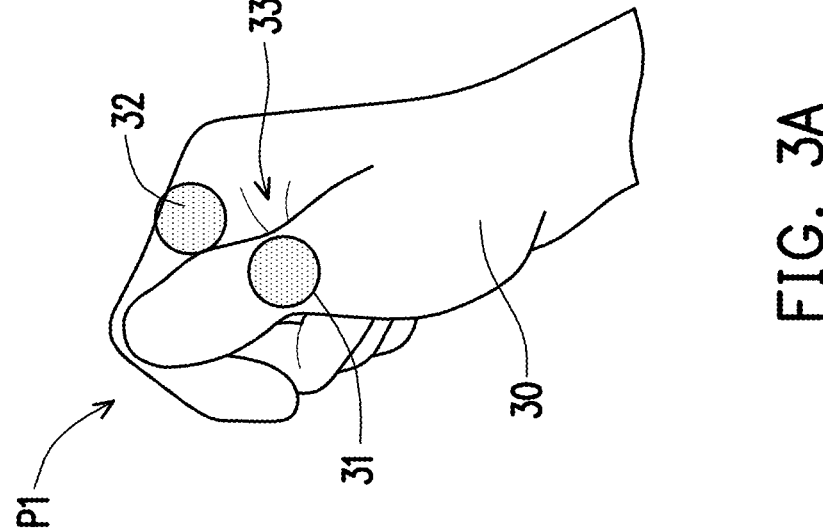

See FIG. 3A and FIG. 3B, wherein FIG. 3A and FIG. 3B show different variations of possible target gestures according to embodiments of the disclosure.

In the embodiment, the hand gesture of the hand 30 may be the hand gesture tracked by the processor 104 in step S210, wherein two wearable devices 31 and 32 (e.g., smart rings) may be respectively worn on, for example, the thumb and index finger of the hand 30, but the disclosure is not limited thereto.

In the embodiments of the disclosure, the target gesture may be a first first gesture where the thumb of the hand 30 is on a side of the index finger of the hand 30, and a fingertip of the thumb is substantially touching a knuckle or fingertip of the index finger, such as the target gesture P1 in FIG. 3A.

In other embodiments of the disclosure, the target gesture may be a second first gesture where a thumb of the hand at least partially covers a first eye 33 of the second first gesture, such as the target gestures P1 and P2 in FIG. 3A and FIG. 3B. For clarity, the term "fist eye" generally refers to the central point or area within a clenched fist, which can also include the central indentation or opening formed by the arrangement of the fingers, excluding the thumb, when making a fist, but the disclosure is not limited thereto.

In step S220, in response to determining that the hand gesture of the hand indicates that the hand has performed the target gesture, the processor 104 displays a virtual input interface in a visual content associated with a reality service.

Figure 4:
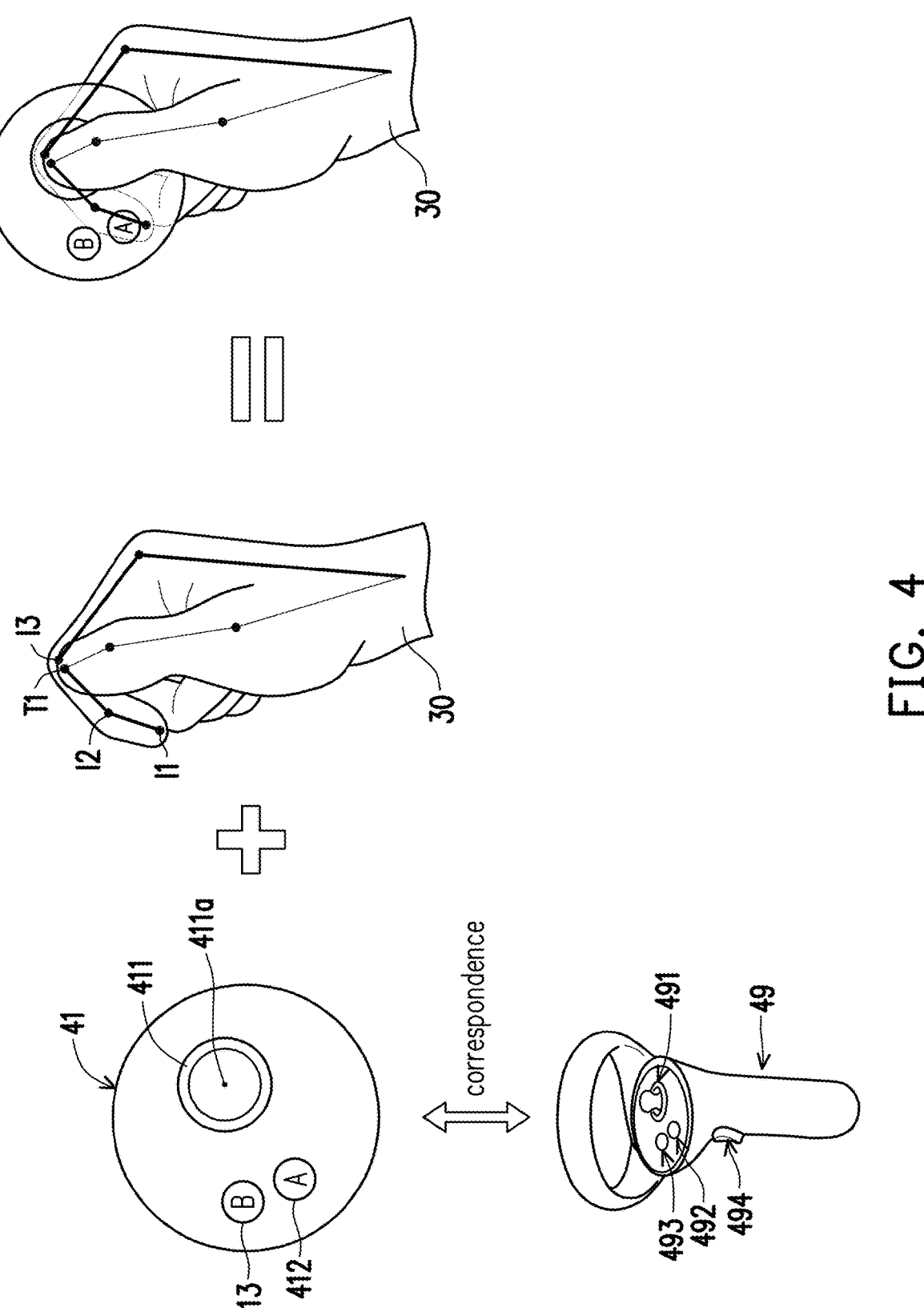
FIG. 4 shows a schematic diagram of the virtual input interface according to an embodiment of the disclosure.

See FIG. 4, which shows a schematic diagram of the virtual input interface according to an embodiment of the disclosure.

In FIG. 4, the processor 104 may display the virtual input interface 41 in the visual content (e.g., VR content) when the processor 104 determines that the hand gesture of the hand 30 has performed the target gesture.

In the embodiment, the virtual input interface 41 provides a controller-like function. In one embodiment, the virtual input interface 41 corresponds to a physical handheld controller 49 having physical input elements (e.g., physical joystick 491, a first physical button 492, a second physical button 493, and a third physical button 494), wherein the physical handheld controller 49 may be, for example, a VR handheld controller for interacting with VR contents, but the disclosure is not limited thereto.

In the embodiments of the disclosure, the virtual input interface 41 may include one or more virtual input element. In FIG. 4, the virtual input elements in the virtual input interface 41 may include a virtual joystick 411, a first virtual button 412, and a second virtual button 413. In the embodiment, the virtual joystick 411, the first virtual button 412, and the second virtual button 413 may respectively corresponds to the physical joystick 491, the first physical button 492 (e.g., A button), and the second physical button 493 (e.g., B button) on the physical handheld controller 49, but the disclosure is not limited thereto.

In other embodiments, the virtual input interface 41 may be designed to have other appearance, layout, and/or configurations, but the disclosure is not limited thereto.

In some embodiments, the layout of the virtual input interface 41 (e.g., size, shape and/or virtual input elements therein) may be customized/adjusted by the user, which would be discussed later in the disclosure.

In the embodiments of the disclosure, the virtual input interface 41 is moved along with the hand. For example, when the user is experiencing/interacting with the visual content (e.g., VR contents) provided by the host 100 (e.g., HMD) by using hand gesture, the processor 104 may show the virtual input interface 41 in the visual content after detecting the target gesture. Afterwards, the user may interact with the visual content while substantially maintaining the target gesture, and during which, the processor 104 may move the virtual input interface 41 along with the movement of the hand 30.

In one embodiment, the processor 104 may track a feature point on the hand 30 and keep one virtual input element on the virtual input interface 41 aligned with the feature point during moving the virtual input interface 41 along with the hand.

In FIG. 4, the considered feature point tracked by the processor 104 may be the feature point I3, which may be one of the knuckles of the index finger of the hand 30. In addition, the virtual input element kept aligned with the considered feature point may be the virtual joystick 411 of the virtual input interface 41. In this case, during the user experiencing the visual content by substantially maintaining the target gesture, the virtual input interface 41 may be moved around with the moving hand gesture.

In the embodiment, the processor 104 can also track other feature points on the hand 30, such as the feature points I1, I2, and T1 respectively corresponding to the fingertip of the index finger, another knuckle of the index finger, and the fingertip of the thumb of the hand 30, but the disclosure is not limited thereto.

In other embodiments, the processor 104 may keep other virtual input element on the virtual input interface 41 aligned with other feature point during moving the virtual input interface 41 along with the hand. For example, the processor 104 may keep the first virtual button 412 aligned with the feature point I1 during moving the virtual input interface 41 along with the hand. For another example, the processor 104 may keep the second virtual button 413 aligned with the feature point I2 during moving the virtual input interface 41 along with the hand, but the disclosure is not limited thereto.

In one embodiment, the processor 104 may further track the eye gaze of the user to the visual content. In this case, in response to determining that the hand gesture of the hand 30 indicates that the hand 30 has performed the target gesture (e.g., the first/second first gesture), the processor 104 may further determine whether the eye gaze is on the hand 30.

In one embodiment, in response to determining the eye gaze is on the hand 30, it may represent that the user intends to interact with the visual content by using the virtual input interface 41, and hence the processor 104 may accordingly display the virtual input interface 41 in the visual content associated with the reality service. On the other hand, in response to determining the eye gaze is not on the hand, it represents that the user may have no intention to interact with the visual content by using the virtual input interface 41, and hence the processor 104 may not display the virtual input interface 41, but the disclosure is not limited thereto.

As mentioned in the above, once the virtual input interface 41 has been displayed, the user may interact with the visual content by using the virtual input interface 41. Specifically, the user may perform one or more input operations with the virtual input interface 41 in a similar way of operating the physical handheld controller 49, and the processor 104 may determine the input operation(s) based on the interaction between the hand 30 and the virtual input interface 41.

In a first embodiment, the processor 104 may determine whether the interaction between the hand 30 and the virtual input interface 41 indicates that the hand 30 triggers a virtual input element on the virtual input interface 41, wherein the virtual input element may correspond to a first physical input element. If yes, the processor 104 may generate a first input signal corresponding to the first physical input element.

For example, assuming that the triggered virtual input element is the first virtual button 412 corresponding to, for example, the A button (e.g., the considered first physical input element) on the physical handheld controller 49, the processor 104 may generate the first input signal corresponding to the A button on the physical handheld controller 49. That is, when the interaction between the hand 30 and the virtual input interface 41 indicates that the first virtual button 412 has been triggered, the processor 104 may determine that the user intends to perform the input operation corresponding to triggering the A button. In this case, the processor 104 may accordingly generate the first input signal corresponding to the A button and accordingly adjust the visual content, but the disclosure is not limited thereto.

In the first embodiment, in response to determining that the thumb of the hand 30 triggers the virtual input element, the processor 104 may determine that the hand 30 triggers the virtual input element.

In a first variant of the first embodiment, the considered virtual input element may be a virtual button (e.g., the first virtual button 412). In this case, in response to determining that the fingertip of the thumb of the hand 30 locates in a display range of the virtual button, the processor 104 may determine that the thumb of the hand 30 triggers the virtual input element. For example, when the processor 104 determines that the feature point T1 (which corresponds to the fingertip of the thumb) locates in the display range of the first virtual button 412, the processor 104 may determine that the thumb of the hand 30 triggers the first virtual button 412. That is, the user may trigger the first virtual button 412 by using the fingertip of the thumb to (virtually) touch the first virtual button 412, but the disclosure is not limited thereto.

In a second variant of the first embodiment, the considered virtual input element may be a virtual button (e.g., the first virtual button 412 corresponding to the feature point I1). In this case, in response to determining that a distance between a fingertip of the thumb and a feature point on the hand 30 corresponding to the virtual button is smaller than a distance threshold, the processor 104 may determine that the thumb of the hand 30 triggers the virtual input element. For example, when the processor 104 determines that the distance between the feature point T1 (which corresponds to the fingertip of the thumb) and the feature point I1 (which corresponds to the first virtual button 412) is smaller than the distance threshold, the processor 104 may determine that the thumb of the hand 30 triggers the first virtual button 412. That is, the user may trigger the first virtual button 412 by moving the fingertip of the thumb to be close to (even physically touching) the fingertip of the index finger, but the disclosure is not limited thereto.

In a second embodiment, the processor 104 may determine whether the interaction between the hand 30 and the virtual input interface 41 indicates that the hand 30 triggers a virtual input element on the virtual input interface 41, wherein the virtual input element may correspond to a first physical input element. If yes, the processor 104 may generate a first input signal corresponding to the first physical input element.

For example, assuming that the triggered virtual input element is the virtual joystick 411 corresponding to, for example, the physical joystick 491 (e.g., the considered first physical input element) on the physical handheld controller 49, the processor 104 may generate the first input signal corresponding to the physical joystick 491 on the physical handheld controller 49. That is, when the interaction between the hand 30 and the virtual input interface 41 indicates that the virtual joystick 411 has been triggered, the processor 104 may determine that the user intends to perform the input operation corresponding to triggering the physical joystick 491. In this case, the processor 104 may accordingly generate the first input signal corresponding to the physical joystick 491 and accordingly adjust the visual content, but the disclosure is not limited thereto.

In the second embodiment, in response to determining that the thumb of the hand 30 triggers the virtual input element, the processor 104 may determine that the hand 30 triggers the virtual input element.

In a first variant of the second embodiment, the considered virtual input element may be the virtual joystick 411 having a center 411*a*. In this case, in response to determining that the fingertip of the thumb of the hand 30 locates in a display range of the virtual input element, the processor 104 may determine that the thumb of the hand 30 triggers the virtual input element and accordingly generate the first input signal. For example, when the processor 104 determines that the feature point T1 (which corresponds to the fingertip of the thumb) locates in the display range of the virtual joystick 411, the processor 104 may determine that the thumb of the hand 30 triggers the virtual joystick 411. That is, the user may trigger the virtual joystick 411 by using the fingertip of the thumb to (virtually) touch the virtual joystick, but the disclosure is not limited thereto.

In the first variant of the second embodiment, the first input signal may be generated based on a first relative position between the fingertip of the thumb and the center 411*a* of the virtual joystick 411. For example, if the first relative position indicates that the fingertip of the thumb (characterized by the feature point T1) is on a first side of the center 411*a*, the processor 104 may accordingly generate the first input signal corresponding to the physical joystick 491 being pushed toward the first side.

In a second variant of the second embodiment, the considered virtual input element may be the virtual joystick 411 having a center 411*a*. In this case, in response to determining that a distance between the fingertip of the thumb and a feature point on the hand 30 corresponding to the center 411*a* of the virtual joystick 411 is within a distance range, the processor 104 may determine that the thumb of the hand 30 triggers the virtual input element. For example, when the processor 104 determines that the distance between the feature point T1 (which corresponds to the fingertip of the thumb) and the feature point I3 (which may correspond to the center 411*a*) is within the distance range, the processor 104 may determine that the thumb of the hand 30 triggers the virtual joystick 411, wherein the distance range may be determined based on the radius of the display range of the virtual joystick 411. That is, the user may trigger the virtual joystick 411 by moving the fingertip of the thumb to be near the knuckle corresponding to the feature point I3, but the disclosure is not limited thereto.

In the second variant of the second embodiment, the first input signal may be generated based on a second relative position between the fingertip of the thumb and the feature point considered in the above (e.g., the feature point I3). For example, if the second relative position indicates that the fingertip of the thumb (characterized by the feature point T1) is on a first side of the feature point I3, the processor 104 may accordingly generate the first input signal corresponding to the physical joystick 491 being pushed toward the first side.

In the embodiments of the disclosure, if the hand gesture of the hand 30 is tracked by the first and second wearable devices mentioned in the above, the processor 104 may determine the interaction between the hand 30 and the virtual input interface 41 by considering the relative readings between the first and second motion data.

For example, if the respective readings of the first and second motion data show that the first and second wearable devices have been moved, but the relative readings between the first and second motion data show that the relative position between first and second wearable devices are not changed, it represents that the user simply move the hand as a whole instead of moving the fingers to interact with the virtual input interface 41.

On the other hand, if the relative readings between the first and second motion data show that the relative position between first and second wearable devices has been changed, it may represent that the user is moving the fingers to interact with the virtual input interface 41, and hence the processor 104 may accordingly determine whether the interaction between the hand 30 and the virtual input interface 41 indicates that the hand 30 triggers a virtual input element on the virtual input interface 41, but the disclosure is not limited thereto.

In addition, since the physical handheld controller 49 is disposed with the third physical button 494 (which allows the user to do the action similar to pulling the trigger of a gun), the embodiments of the disclosure also provide a solution for the user to perform the input operation corresponding to the third physical button 494 after displaying the virtual input interface 41. The associated details would be discussed in a third embodiment in the following. For better understanding, FIG. 5 would be used as an example, but the disclosure is not limited thereto.

Figure 5:
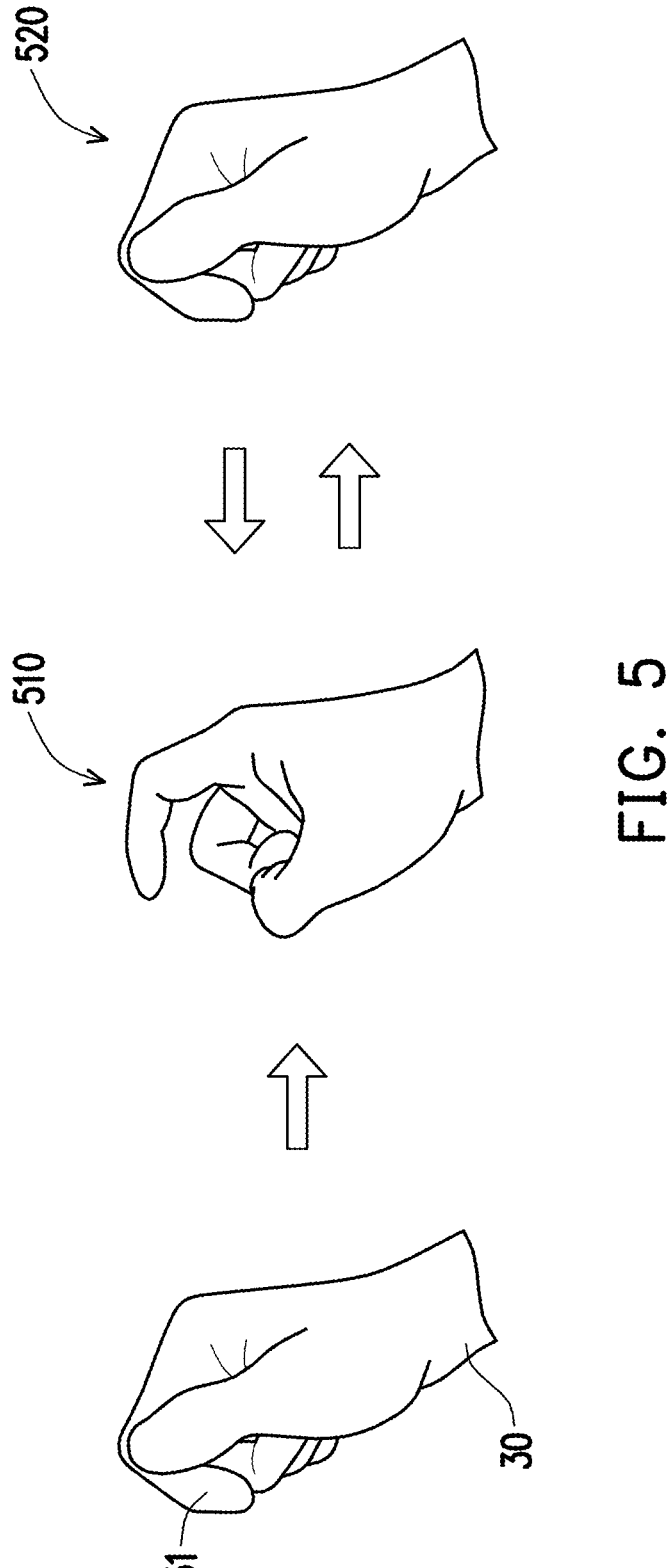
FIG. 5 shows an application scenario according to the third embodiment of the disclosure.

See FIG. 5, which shows an application scenario according to the third embodiment of the disclosure.

In the third embodiment, the processor 104 may determine whether a specific finger 51 (e.g., the index finger) of the hand 30 has performed a specific movement to become a first predetermined finger gesture 510.

In the third embodiment, the processor 104 may determine whether the specific finger 51 of the hand 30 has performed the specific movement based on, for example, the second motion data and/or the relative readings between the first and second motion data as mentioned in the above.

In the third embodiment, in response to determining that the specific finger 51 has been straightened and then incompletely bent, the processor 104 may determine that the specific finger 51 of the hand 30 has performed the specific movement to become the first predetermined finger gesture 510. From another perspective, if the processor 104 determines that the specific finger 51 originally being a part of the target gesture is firstly straightened and then become a half-bent state, the processor 104 may determine that the specific finger 51 of the hand 30 has performed the specific movement to become the first predetermined finger gesture 510, but the disclosure is not limited thereto.

In the third embodiment, in response to determining that the specific finger 51 of the hand 30 has performed the specific movement to become the first predetermined finger gesture 510, the processor 104 may subsequently determine whether the specific finger 51 has been changed from the first predetermined finger gesture 510 to a second predetermined finger gesture 520.

In the third embodiment, in response to determining that the specific finger 51 has been changed from being incompletely bent to being completely bent, the processor 104 may determine that the specific finger 51 has been changed from the first predetermined finger gesture 510 to the second predetermined finger gesture 520. From another perspective, if the processor 104 determines that the specific finger 51 has been changed from the half-bent state to a fully-bent state, the processor 104 may determine that the specific finger 51 has been changed from the first predetermined finger gesture 510 to the second predetermined finger gesture 520, but the disclosure is not limited thereto.

In the third embodiment, in response to determining that the specific finger 51 has been changed from the first predetermined finger gesture 510 to the second predetermined finger gesture 520, the processor 104 may generate a second input signal corresponding to a second physical input element.

In one embodiment, the second physical input element may be the third physical button 494 on the physical handheld controller 49. In this case, when the processor 104 determines that the specific finger 51 has been changed from the first predetermined finger gesture 510 to the second predetermined finger gesture 520, it may represent that the user intends to perform the input operation corresponding to triggering the third physical button 494 (which may be understood as a trigger button). In this case, the processor 104 may accordingly generate the second input signal corresponding to the third physical button 494 and accordingly adjust the visual content, but the disclosure is not limited thereto.

In the third embodiment, in response to determining that the second predetermined finger gesture 520 has been held, the processor 104 may keep generating the second input signal corresponding to the second physical input element until the specific finger 51 stops doing the second predetermined finger gesture 520.

In the embodiment where the second physical input element is assumed to be the third physical button 494, the user may be allowed do a one-time trigger (e.g., shooting one bullet in a VR game application) by sequentially doing the first predetermined finger gesture 510, the second predetermined finger gesture 520, and the first predetermined finger gesture 510. In addition, the user may be allowed do a continuing trigger (e.g., continuously shooting bullets in the VR game application) by switching from the first predetermined finger gesture 510 to the second predetermined finger gesture 520, and hold the second predetermined finger gesture 520 until the user wants to stop, but the disclosure is not limited thereto.

In addition, in response to determining that the specific finger 51 of the hand 30 has performed the specific movement to become the first predetermined finger gesture 510, the processor 104 may further provide a vibrating signal to the wearable device worn on the specific finger 51 (e.g., the wearable device 32 worn on the index finger), such that the wearable device can be controlled to provide a vibrating action to notify that the first predetermined finger gesture 510 has been successfully detected, but the disclosure is not limited thereto.

In some embodiments, the processor 104 may determine whether the hand gesture has been changed from the target gesture to a cancelling gesture (e.g., an open palm gesture). If yes, it represents that the user may intend to stop interacting with the visual content by using the virtual input interface 41, and hence the processor 104 may stop displaying the virtual input interface 41, but the disclosure is not limited thereto.

In addition, if the virtual input interface 41 is displayed after determining the eye gaze of the user locates on the first gesture, the processor 104 may determine to stop displaying the virtual input interface 41 if the eye gaze is determined to be locating on the hand gesture again, but the disclosure is not limited thereto.

As mentioned in the above, the layout of the virtual input interface 41 (e.g., size, shape and/or virtual input elements therein) may be customized/adjusted by the user, and the detailed discussions would be provided in the following.

Figure 6:
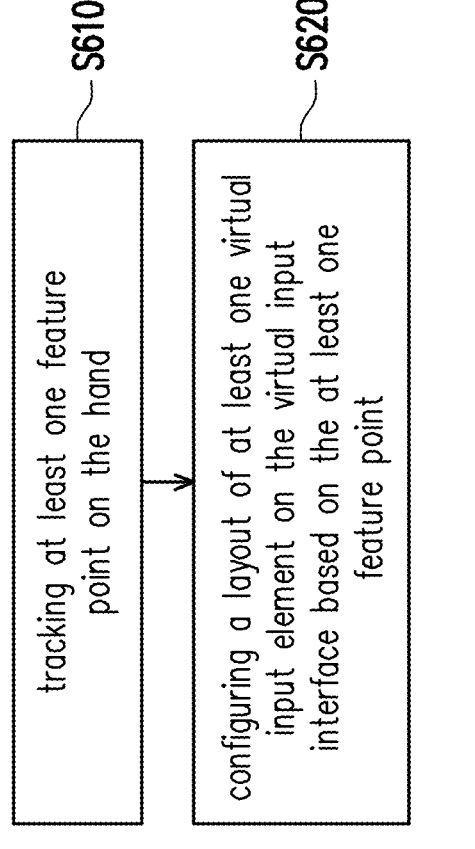
FIG. 6 shows a flow chart of the method for configuring a virtual input interface according to an embodiment of the disclosure.

See FIG. 6, which shows a flow chart of the method for configuring a virtual input interface according to an embodiment of the disclosure. The method of this embodiment may be executed by the host 100 in FIG. 1, and the details of each step in FIG. 6 will be described below with the components shown in FIG. 1.

In step S610, the processor 104 tracks at least one feature point on a hand. In step S620, the processor 104 configures a layout of at least one virtual input element on the virtual input interface based on the at least one feature point.

For better understanding, the hand considered in step S610 may be assumed to be the hand 30 mentioned in the above embodiments, and the at least one feature point on the hand may be correspondingly assumed to be the feature points on the hand 30, such as the feature points I1 to I3 and/or T1, but the disclosure is not limited thereto. In addition, the virtual input interface considered in step S620 may be assumed to be the virtual input interface 41 mentioned in the above, and hence the virtual input element thereon may include, for example, the virtual joystick 411, the first virtual button 412, and the second virtual button 413, but the disclosure is not limited thereto.

In the embodiments of the disclosure, the reality service (e.g., the VR service) may provide a virtual interface configuring function for allowing the user to configure the layout of the virtual input interface 41. For example, the system (e.g., the VR system) of the reality service may provide the virtual interface configuring function in the systematic setting interface.

In one embodiment, in response to determining that the virtual interface configuring function in the reality service has been triggered, the processor 104 may provide a configuring interface for configuring the layout of the virtual input element on the virtual input interface 41.

In this case, the processor 104 may start performing step S610 after providing the configuring interface and accordingly perform step S620, but the disclosure is not limited thereto.

In one embodiment, before performing step S620, the processor 104 may request the hand 30 to perform the target gesture. For example, once the processor 104 provides the configuring interface, the processor 104 may request the user to perform the target gesture via, but not limited thereto, textual/visual/audio notifications, such that the user may be guided to perform the first gesture for the processor 104 to better track the feature points on the hand 30, but the disclosure is not limited thereto.

In one embodiment, the processor 104 may determine whether the hand 30 has performed the target gesture. In response to determining that the hand 30 has performed the target gesture, it means that the current hand gesture has been proper for configuring the layout of the virtual input interface 41. Therefore, the processor 104 may configure the layout of the virtual input elements on the virtual input interface 41 based on the feature points on the hand 30.

On the other hand, in response to determining that the hand 30 has not performed the target gesture, it means that the current hand gesture may not be proper for configuring the layout of the virtual input interface 4, and hence the processor 104 may not configure the layout of the virtual input elements on the virtual input interface 41, but the disclosure is not limited thereto.

In various embodiments, step S620 can be implemented in different ways, which would be discussed in the following embodiments.

In a fourth embodiment, the processor 104 may allow the user to manually establish the association relationship between a certain feature point on the hand 30 and a certain virtual input element on the virtual input interface 41. Next, the processor 104 may determine to display the first virtual input element at a position where the first feature point locates.

For example, the processor 104 may show the tracked feature points on the hand 30 as shown in the middle of FIG. 4, and request the user to assign which of the feature points should correspond to which of the virtual input elements.

In one embodiment, the established association relationships between the feature points and the virtual input elements may be exemplarily shown in the following Table 1.

TABLE 1

|  | Feature point I1 | Feature point I2 | Feature point I3 |
|---|---|---|---|
| Virtual joystick 411 |  |  | V |
| First virtual button 412 | V |  |  |
| Second virtual button 413 |  | V |  |

As can be seen from the above, the feature points I3, I1, and I2 have been respectively assigned to be corresponding to the virtual joystick 411, the first virtual button 412, and the second virtual button 413, but the disclosure is not limited thereto.

In this case, the processor 104 may determine to display the virtual joystick 411 at the position where the feature point I3 locates, display the first virtual button 412 at the position where the feature point I1 locates, and display the second virtual button 413 at the position where the feature point I2 locates. Accordingly, the layout of the virtual input interface 41 can be determined. More specifically, the positions of the virtual input elements of the virtual input interface 41 can be determined, but the disclosure is not limited thereto.

In one embodiment, the processor 104 can further display the virtual input interface 41 with the configured layout for the user to see. In this case, the user may see that the virtual joystick 411, the first virtual button 412, and the second virtual button 413 have been respectively displayed at the positions where the feature points I3, I1, and I2 locate, but the disclosure is not limited thereto.

In some embodiments, since different users may have different sizes of hand, the embodiments of the disclosure may scale the size of the virtual input interface 41 accordingly.

Specifically, in a fifth embodiment, the processor 104 may determining size information of the hand 40 based on the feature points thereon. Next, the processor 104 may adjust the size of the virtual input interface 41 based on the size information of the hand 30. In the fifth embodiment, the size information of the hand 30 may include at least one of a reference length and a reference area associated with the hand 30. For example, the reference length may include at least one of a finger length of the hand 30 (which may be derived based on the distances between the feature points on the considered finger) and a palm width of the hand 30. In addition, the reference area may include an area of a fingertip of the thumb of the hand 30, but the disclosure is not limited thereto.

In the fifth embodiment, the processor 104 may determine a ratio by comparing the reference length with a predetermined length or by comparing the reference area with a predetermined area. In one embodiment, the predetermined length may be, for example, the finger length and/or the palm width of a regular people's hand. Likewise, the predetermined area may be the area of the fingertip of the thumb of a regular people.

After determining the ratio, the processor 104 may scale the size of the virtual input interface 41 by the ratio.

From another perspective, the processor 104 may determine the ratio by which the hand 30 is larger or smaller compared to a regular people's hand and accordingly scale the size of the virtual input interface 41. In this case, if the hand 30 is larger than the regular people's hand, the processor 104 may scale up the size of the virtual input interface 41, and vice versa.

Figure 7:
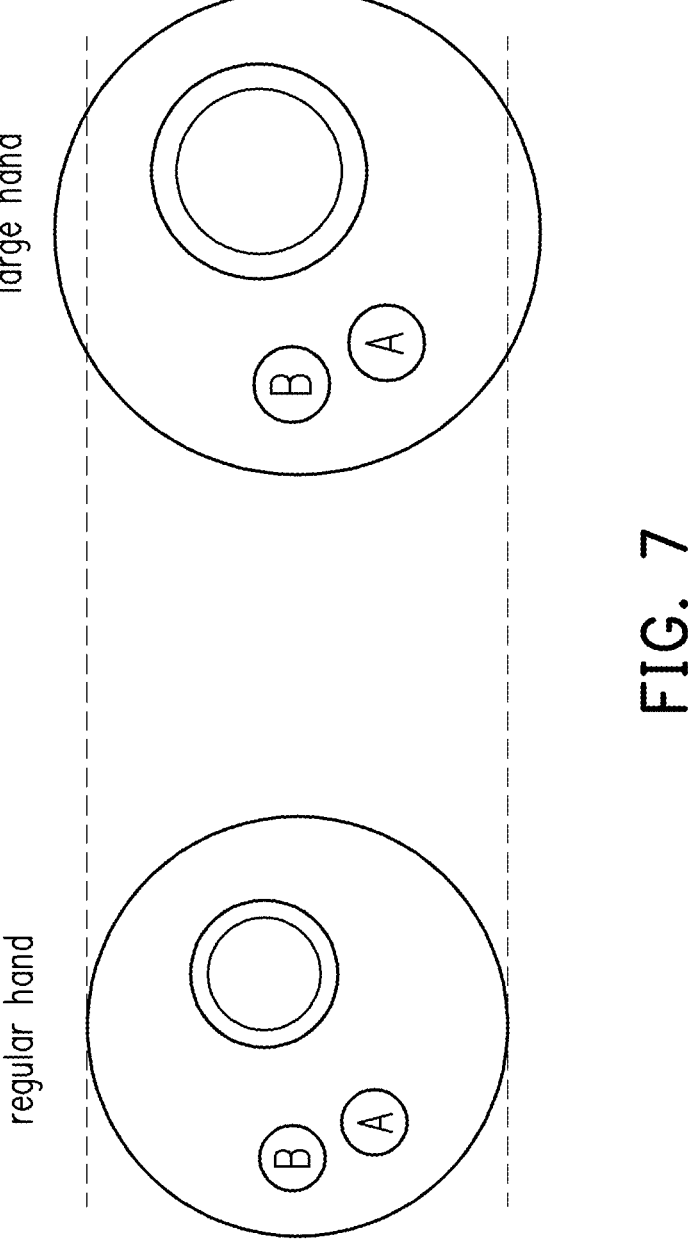
FIG. 7 shows a schematic diagram of the virtual input interfaces with different sizes according to the fifth embodiment of the disclosure.

See FIG. 7, which shows a schematic diagram of the virtual input interfaces with different sizes according to the fifth embodiment of the disclosure.

On the left side of FIG. 7, the size of the virtual input interface may be suitable for a hand with regular size. On the other hand, the size of the virtual input interface on the right side of FIG. 7 may be suitable for a hand with larger size, but the disclosure is not limited thereto.

In a sixth embodiment, during configuring the virtual input interface 41 (e.g., in the configuring interface), the processor 104 may display the virtual input interface 41, wherein the virtual input interface 41 may be displayed with a default layout (e.g., the virtual input elements are having default size/positions) at a default position in the visual content.

In the sixth embodiment, the feature points may be assumed to include a first feature point and a second feature point, and the virtual input elements may be assumed to include a first virtual input element and a second virtual input element.

In the embodiment, the processor 104 may determine whether the first feature point has been aligned with the first virtual input element.

In one embodiment, the processor 104 may provide visual/audio guidance to request the user to align the first feature point with the first virtual input element.

In the sixth embodiment, in response to determining that the first feature point has been aligned with the first virtual input element, the processor 104 may determine a reference position associated with the second virtual input element within the virtual input interface 41 based on the first feature point and the second feature point, and display the second virtual input element at the reference position within the virtual input interface 41.

Figure 8:
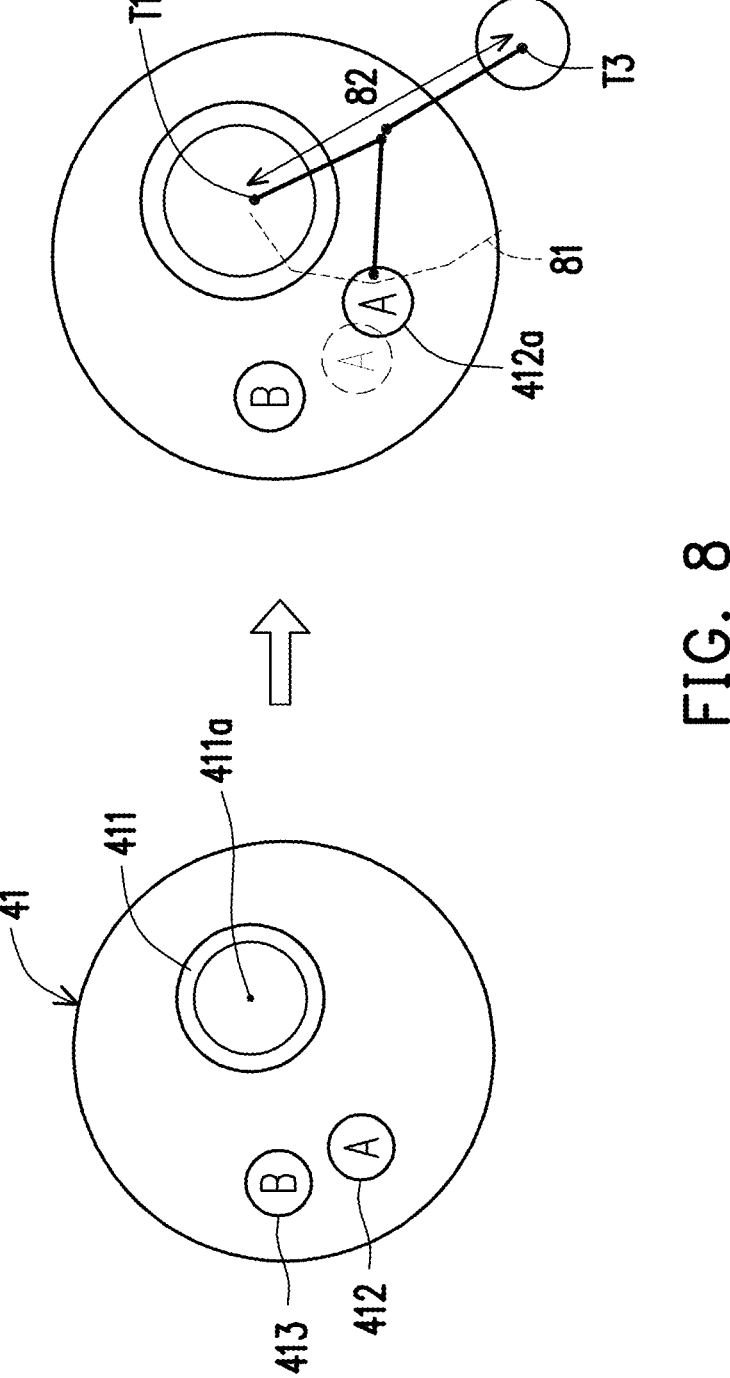
FIG. 8 shows a schematic diagram of configuring the virtual input interface according to the sixth embodiment.

For better understanding, FIG. 8 would be used as an example, wherein FIG. 8 shows a schematic diagram of configuring the virtual input interface according to the sixth embodiment.

In FIG. 8, the considered first virtual input element may be assumed to be the virtual joystick 411, and the considered second virtual input element may be assumed to be the first virtual button 412. In addition, the first feature point may be assumed to be the feature point T1, and the second feature point may be assumed to be the feature point T3 (which is a basal joint of the thumb of the hand 30), but the disclosure is not limited thereto.

In FIG. 8, the processor 104 may display the virtual input interface 41 with regular configuration (e.g., the layout on the left side of FIG. 8) and request the user to align the feature point T1 (e.g., the fingertip of the thumb) with (the center 411*a*) of the virtual joystick 411. In other embodiments, the size of the virtual input interface 41 may be adjusted by using the mechanism introduced in the fifth embodiment in advance, but the disclosure is not limited thereto.

In response to determining that the feature point T1 has been aligned with the virtual joystick 411, the processor 104 may determine a reference position associated with the first virtual button 412 within the virtual input interface 41 based on the feature points T1 and T3, and display the first virtual button 412 at the reference position within the virtual input interface 41, wherein the first virtual button 412 located at the reference position may be referred to as the first virtual button 412*a* on the right side of FIG. 8, but the disclosure is not limited thereto.

In FIG. 8, the processor 104 may determine a reference path 81 within the virtual input interface 41 based on the feature point T3 (e.g., the second feature point) and a distance 82 between the feature points T1 and T3 (e.g., the distance between the considered first feature point and the second feature point). In the embodiment, the reference path 81 may be an arc-like path, and the distance between each point on the reference path 81 may be smaller than the distance 82. That is, the user may easily reach each point on the reference path 81 with the fingertip of the thumb, but the disclosure is not limited thereto.

Next, the processor 104 may determine a reference point on the reference path 81 as the reference position associated with the first virtual button 412 (e.g., the considered second virtual input element) within the virtual input interface 41. In the embodiment, the reference point may be any point on the reference path 81.

As can be seen from FIG. 8, the first virtual button 412 on the left of FIG. 8 may be regarded as locating at a position where the user is difficult to reach with the fingertip of the thumb. However, as can be seen from the right of FIG. 8, the first virtual button 412*a* has been adjusted to locate at a position where the user can easily reach with the fingertip of the thumb.

Likewise, the second virtual button 413 can also be adjusted to locate at a position where the user can easily reach with the fingertip of the thumb, such as another point on the reference path 81. In one embodiment, the position of the second virtual button 413 may be determined based on the original relative position between the default positions of the first virtual button 412 and the second virtual button 413. For example, since the default position of the second virtual button 413 is above the default position of the first virtual button 412, the position of the second virtual button 413 on the reference path 81 may be determined to be, for example, somewhere between the first virtual button 412*a* and the feature point T1, but the disclosure is not limited thereto.

From another perspective, the sixth embodiment may be understood as replacing the first virtual button 412 at another position easier for the user to reach based on the finger length of the thumb, but the disclosure is not limited thereto.

In a seventh embodiment, the processor 104 may determine a first reference position and a second reference position within the virtual input interface 41 based on the first feature point and the second feature point. In the embodiment, the first reference position and the second reference position may be the positions where the first feature point and the second feature point locate, but the disclosure is not limited thereto.

In the embodiment, the size of the virtual input interface 41 may be adjusted by using the mechanism introduced in the fifth embodiment in advance, but the disclosure is not limited thereto.

Next, the processor 104 may display the first virtual input element and the second virtual input element at the first reference position and the second reference position within the virtual input interface 41, respectively.

That is, when determining the positions of the first virtual input element and the second virtual input element within the virtual input interface 41, the processor 104 may directly place the first virtual input element and the second virtual input element at the positions where the corresponding first feature point and the second feature point locate in the virtual input interface 41.

For example, assuming that the first feature point and the second feature point are the feature point I3 and I1, respectively, the corresponding first virtual input element and the second virtual input element may be the virtual joystick 411 and the first virtual button 412, respectively. In this case, when determining the positions of the virtual joystick 411 and the first virtual button 412 within the virtual input interface 41, the processor 104 may directly place the virtual joystick 411 and the first virtual button 412 at the positions where the corresponding feature point I3 and I1 locate in the virtual input interface 41.

Likewise, the processor 104 may also directly place the second virtual button 413 at the position where the corresponding feature point I2 locate in the virtual input interface 41, but the disclosure is not limited thereto.

In one embodiment, the system of the reality service may allow the user to perform a confirmation operation if the user has done configuring the layout of the virtual input interface 41.

Therefore, in response to determining that the confirmation operation has been detected, the processor 104 may fix the layout of the virtual input elements on the virtual input interface 41. For example, the processor 104 may store the size of the virtual input interface 41 and the sizes/relative positions of the virtual input elements therein for future use. For example, the virtual input interface 41 whose layout has been fixed may be applied when, for example, an application of the reality service is executed.

In this case, in response to determining that an application (e.g., a VR application) has been executed, the processor 104 may apply the virtual input interface 41 with the fixed layout.

For example, the processor 104 may perform step S210 and display the virtual input interface 41 with the fixed layout in response to determining that the hand gesture of the hand 30 indicates that the hand 30 has performed the target gesture, and the associated details may be referred to the above embodiments.

In one embodiment, the method in FIG. 6 can be performed prior to the method in FIG. 2. That is, the processor 104 may firstly allow the user to configure the required layout of the virtual input interface 41 based on the method in FIG. 6. Afterwards, when the user performs the target gesture during interacting with the visual content of the reality service, the processor 104 may accordingly display the virtual input interface 41 with the layout previously configured by the user, but the disclosure is not limited thereto.

The disclosure further provides a computer readable storage medium for executing the method for providing an input interface and/or the method for configuring the virtual input interface. The computer readable storage medium is composed of a plurality of program instructions (for example, a setting program instruction and a deployment program instruction) embodied therein. These program instructions can be loaded into the host 100 and executed by the same to execute the method for providing an input interface and/or the method for configuring the virtual input interface and the functions of the host 100 described above.

In summary, the embodiments of the disclosure provide a solution to display the virtual input interface in response to determining that the user has performed the target gesture. In the embodiments of the virtual input interface corresponding to the physical handheld controller, the user may be allowed to interact with the reality service (e.g., VR applications) in a way similar to operating the physical handheld controller by using hand gestures. Accordingly, the effort of the reality service used on educating and/or guiding the user for learning gesture-based interactions can be reduced.

In addition, the embodiments of the disclosure further provide a solution to configure the layout of the virtual input interface, which can be used to improve the intuitiveness in user operation.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for configuring a virtual input interface in a visual content of a reality service, applied to a host, comprising:

tracking, by the host, at least one feature point on a hand;

tracking a hand gesture of the hand;

in response to determining that the hand gesture of the hand indicates that the hand has performed a first gesture where a thumb of the hand at least partially covers a first eye, displaying the virtual input interface in the visual content associated with the reality service, wherein the virtual input interface provides a controller-like function, and the virtual input interface is moved along with the hand; and configuring, by the host, a layout of at least one virtual input element on the virtual input interface based on the at least one feature point, comprising:

displaying the virtual input interface on a top of the first eye of the hand, wherein the at least one feature point comprises a first feature point and a second feature point, and the at least one virtual input element comprises a first virtual input element and a second virtual input element at a regular position;

in response to determining that the first feature point has been aligned with the first virtual input element, determining a reference position associated with the second virtual input element within the virtual input interface based on the first feature point and the second feature point, wherein the regular position associated with the second virtual input element of the virtual input interface on the top of the first eye of the hand is replaced at the reference position associated with the second virtual input element of the virtual input interface on the top of the first eye of the hand; and displaying the second virtual input element at the reference position within the virtual input interface.

2. The method according to claim 1, comprising:

in response to determining that the first feature point among the at least one feature point is assigned to be corresponding to the first virtual input element among the at least one virtual input element, establishing an association relationship between the first feature point and the first virtual input element; and determining to display the first virtual input element at a position where the first feature point locates.

3. The method according to claim 1, wherein the at least one feature point on the hand comprises at least one of a fingertip and knuckle of at least one of a thumb and index finger of the hand.

4. The method according to claim 1, wherein before configuring the layout of the at least one virtual input element on the virtual input interface based on the at least one feature point, the method further comprises:

determining size information of the hand based on the at least one feature point; and adjusting a size of the virtual input interface based on the size information of the hand.

5. The method according to claim 4, wherein the size information of the hand comprises at least one of a reference length and a reference area associated with the hand, and adjusting the size of the virtual input interface based on the size information of the hand comprises:

determining a ratio by comparing the reference length with a predetermined length or by comparing the reference area with a predetermined area; and scaling the size of the virtual input interface by the ratio.

6. The method according to claim 5, wherein the reference length comprises at least one of a finger length of the hand, a palm width of the hand, and the reference area comprises an area of a fingertip of a thumb of the hand.

7. The method according to claim 1, wherein the first feature point comprises a fingertip of a thumb of the hand, the second feature point comprises a basal joint of the thumb of the hand, and determining the reference position associated with the second virtual input element within the virtual input interface based on the first feature point and the second feature point comprises:

determining a reference path within the virtual input interface based on the second feature point and a distance between the first feature point and the second feature point;

determining a reference point on the reference path as the reference position associated with the second virtual input element within the virtual input interface.

8. The method according to claim 7, wherein the first virtual input element comprises a virtual joystick, and the second virtual input element comprises a virtual button.

9. The method according to claim 1, further comprising:

in response to determining that a confirmation operation has been detected, fixing the layout of the at least one virtual input element on the virtual input interface;

in response to determining that an application has been executed, applying the virtual input interface with the fixed layout.

10. The method according to claim 1, wherein the at least one virtual input element comprises at least one of a virtual joystick, a first virtual button, and a second virtual button.

11. The method according to claim 1, wherein before configuring the layout of the at least one virtual input element on the virtual input interface based on the at least one feature point, the method further comprises:

requesting the hand to perform a target gesture.

12. The method according to claim 11, wherein the target gesture is a first first gesture where the thumb of the hand is on a side of an index finger of the hand, and a fingertip of the thumb is substantially touching a knuckle or fingertip of the index finger.

13. The method according to claim 11, wherein the target gesture is a second first gesture where the thumb of the hand at least partially covers the first eye of the second first gesture.

14. The method according to claim 11, further comprising:

in response to determining that the hand has performed the target gesture, configuring the layout of the at least one virtual input element on the virtual input interface based on the at least one feature point;

in response to determining that the hand has not performed the target gesture, not configuring the layout of the at least one virtual input element on the virtual input interface.

15. The method according to claim 1, wherein before tracking the at least one feature point on the hand, the method further comprises:

in response to determining that a virtual interface configuring function in a reality service has been triggered, providing a configuring interface for configuring the layout of the at least one virtual input element on the virtual input interface.

16. A host, comprising:

a non-transitory storage circuit, storing a program code; and a processor, coupled to the non-transitory storage circuit and accessing the program code to perform:

tracking at least one feature point on a hand;

tracking a hand gesture of the hand; and configuring a layout of at least one virtual input element on the virtual input interface in a visual content of a reality service based on the at least one feature point, comprising:

displaying the virtual input interface on a top of a first eye of the hand, wherein the at least one feature point comprises a first feature point and a second feature point, and the at least one virtual input element comprises a first virtual input element and a second virtual input element at a regular position;

in response to determining that the hand gesture of the hand indicates that the hand has performed a first gesture where a thumb of the hand at least partially covers the first eye, displaying the virtual input interface in the visual content associated with the reality service, wherein the virtual input interface provides a controller-like function, and the virtual input interface is moved along with the hand;

in response to determining that the first feature point has been aligned with the first virtual input element, determining a reference position associated with the second virtual input element within the virtual input interface based on the first feature point and the second feature point, wherein the regular position associated with the second virtual input element of the virtual input interface on the top of the first eye of the hand is replaced at the reference position associated with the second virtual input element of the virtual input interface on the top of the first eye of the hand; and displaying the second virtual input element at the reference position within the virtual input interface.

17. A non-transitory computer readable storage medium, the computer readable storage medium recording an executable computer program for a virtual input interface in a visual content of a reality service, the executable computer program being loaded by a host to perform steps of:

tracking at least one feature point on a hand;

tracking a hand gesture of the hand;

in response to determining that the hand gesture of the hand indicates that the hand has performed a first gesture where a thumb of the hand at least partially covers a first eye, displaying the virtual input interface in the visual content associated with the reality service, wherein the virtual input interface provides a controller-like function, and the virtual input interface is moved along with the hand; and configuring a layout of at least one virtual input element on the virtual input interface based on the at least one feature point, comprising:

displaying the virtual input interface on a top of the first eye of the hand, wherein the at least one feature point comprises a first feature point and a second feature point, and the at least one virtual input element comprises a first virtual input element and a second virtual input element at a regular position;

in response to determining that the first feature point has been aligned with the first virtual input element, determining a reference position associated with the second virtual input element within the virtual input interface based on the first feature point and the second feature point, wherein the regular position associated with the second virtual input element of the virtual input interface on the top of the first eye of the hand is replaced at the reference position associated with the second virtual input element of the virtual input interface on the top of the first eye of the hand; and displaying the second virtual input element at the reference position within the virtual input interface.

* * * * *